E. L. Walker.
Hay Fork.

N° 44129 — Patented Sep. 6, 1864.

Witnesses.
C. L. Topliff
Henry Morris

Inventor.
E. L. Walker
By Munn & Co.
Att'y

UNITED STATES PATENT OFFICE.

EDWD. L. WALKER, OF BENFORD'S STORE, PENNSYLVANIA.

IMPROVEMENT IN HAY-ELEVATORS.

Specification forming part of Letters Patent No. 44,129, dated September 6, 1864.

*To all whom it may concern:*

Be it known that I, EDWARD L. WALKER, of Benford's Store, in the county of Somerset and State of Pennsylvania, have invented a new and Improved Hay-Elevator; and I do hereby declare that the following is a full, clear, and exact description thereof, which will enable others skilled in the art to make and use the same, reference being had to the accompanying drawings, forming part of this specification.

Figure 1:
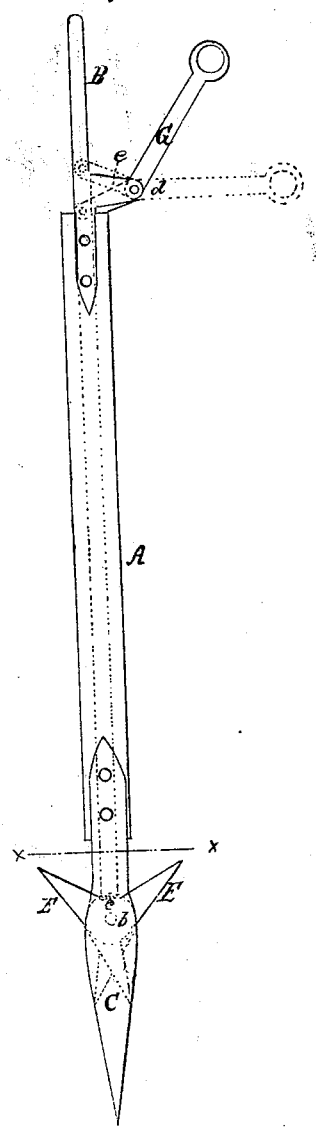
Figure 2:
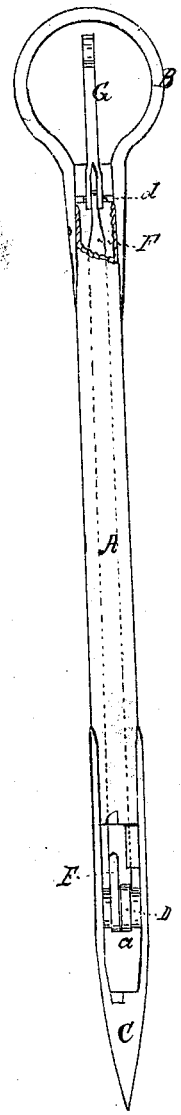
Figure 3:
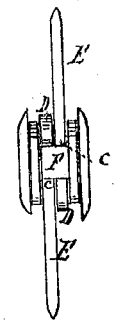

Figures 1 and 2 are external views of my invention; Fig. 3, a horizontal section of the same, taken in the line $x\ x$, Fig. 1.

Similar letters of reference indicate like parts.

This invention relates to a new and simple device for elevating hay in barns and discharging it in mows, and is designed to supersede the ordinary horse hay-forks now used for that purpose.

A represents a tubular rod or shaft, having an eye, B, secured to its upper end, and a pointed head, C, bolted or otherwise secured to its lower end, so that it may enter and be forced into the hay very readily. This head C has a slot or opening, $a$, made entirely through it, in which a rod or shaft, $b$, is fitted transversely, and upon which there are placed loosely two circular plates, D D, each of which is provided with a barb or pointed projection, E, which, when distended, project outward from opposite sides of the head C and incline a little upward, as shown in Fig. 1. Within the tubular rod A there is fitted a square rod, F, which, when pressed down, fits into recesses $c$ in the plates D D, and holds them in the position indicated in Fig. 1. To the upper end of the rod F there is attached a lever, G, the fulcrum-pin $d$ of which passes through an arm, $e$, attached to the tubular rod A. The hoisting-rope is attached to the eye B at the upper end of the tubular rod A, said rope being arranged in the usual way.

In using the implement the operator draws upward the rod F, so as to free the barbs or pointed projections E E, and the latter drop into the head C. The latter is thrust into the hay, and the barbs E E will be forced outward. The implement is then hoisted, the barbs E E holding the load, and when the latter is over the spot where the load is to be deposited the operator pulls a cord attached to the outer end of the lever G, and the rod F is thereby elevated so that its lower end will be drawn out from the recesses $c$ in the plates D D, and the barbs E drop under the gravity of the load, and the latter is discharged.

Having thus described my invention, I claim as new and desire to secure by Letters Patent—

The tubular rod A, provided with an internal sliding rod, F, in combination with the barbs E E, projecting from circular plates D D, placed loosely on a shaft in the pointed head C, and provided with recesses $c$, all arranged substantially as and for the purpose specified.

EDWARD L. WALKER.

Witnesses:
JOSIAH MOWRY,
ADAM J. MILLER.